United States Patent [19]

Young

[11] 4,048,441

[45] Sept. 13, 1977

[54] ERROR CONTROL FOR DIGITAL MULTIPOINT CIRCUITS

[75] Inventor: Charles Edwin Young, Howell Township, Monmouth County, N.J.

[73] Assignee: Bell Telephone Laboratories, Incorporated, Murray Hill, N.J.

[21] Appl. No.: 702,957

[22] Filed: July 6, 1976

[51] Int. Cl.² ............... H04H 9/00; H04Q 5/00; H04L 25/20

[52] U.S. Cl. ............... 178/73; 178/3; 178/69 G; 340/147 LP

[58] Field of Search ............ 340/147 LP; 178/2 R, 178/373; 179/15 BD, 15 AL; 178/69 G

[56] References Cited

U.S. PATENT DOCUMENTS

| | | | |
|---|---|---|---|
| 3,435,142 | 3/1969 | Crowson et al. | 178/73 |
| 3,883,691 | 5/1975 | Pilc et al. | 178/73 |
| 3,914,743 | 10/1975 | Fitch et al. | 340/147 R |
| 3,958,226 | 5/1976 | Kuroda et al. | 179/15 AL |

FOREIGN PATENT DOCUMENTS

| | | | |
|---|---|---|---|
| 964,768 | 3/1975 | Canada | 340/147 LP |
| 2,309,169 | 9/1973 | Germany | 340/147 LP |

*Primary Examiner*—Thomas A. Robinson

*Attorney, Agent, or Firm*—Roy C. Lipton

[57] ABSTRACT

A multipoint synchronous data network is formed by junction units which provide signal paths that interconnect incoming branch lines to a common outgoing branch. The junction units arranged to combine the branches so that data words on one branch are propagated up the common branch, subject to the condition that only one branch can send to the common branch at a time. Each data word includes a designation whether the word carries message information or control information (such as an idle branch condition). Control words are blocked by the junction unit so that message words from a sending branch are not garbled by control words from idle branches. The junction unit passes each message word from a sending branch to the common branch if the junction unit had not priorly passed any message word to the common branch (presumably because all branches were idle) or if a message word priorly passed was from the sending branch whereby error conditions on idle branches simulating message words are not passed to garble the data from the sending branch. This control is maintained by the sending branch for a plurality of word intervals after it has terminated sending data.

9 Claims, 3 Drawing Figures

ERROR CONTROL FOR DIGITAL MULTIPOINT CIRCUITS

FIELD OF THE INVENTION

This invention relates to data communication network hubs or junctions which interconnect branch lines and, more particularly, to hubs or junctions for repeating data from a plurality of data station branch lines to a common branch line.

DESCRIPTION OF THE PRIOR ART

A private line data network shared by a plurality of line stations is known as a multipoint or party line network. Each station has the capability of sending and receiving data over a line loop extending to a central office of a common carrier. At the central office, the line loop is connected to a branch line which is interconnected with other similar branch lines by a hub or junction unit. Each of these other branches may be connected to another station or may extend to another junction unit in the same or in another central office. The multipoint network is thus formed by all of the branch lines coupled to the several multipoint junction units.

In one type of multipoint network, a principal or control station communicates with all other line stations. The principal station is connected to a main or common branch line and signals on the main branch from the principal station are transmitted to the junction unit which broadcasts the signals to all the other branches for transmission to line stations or to other junction unit further downstream. In the latter case, the signal is split again to be broadcast to branches on the downstream junction unit. In the opposite direction, the transmission from each line station passes upstream to the junction unit where the branches are combined and the signal propagated up the main branch line to the principal station, subject to the condition that only one line station, at a time, can send to the principal station. A multipoint network of this type is disclosed in U.S. Pat. No. 3,914,743, issued Oct. 21, 1975 to S. M. Fitch, L. M. Kolensky, J. C. Panek, D. W. Rice and W. R. Schaeffer. This network is incorporated into a synchronous data system wherein each branch line conveys data words in each direction, each word being aligned with words on other branches. Each of the data words includes a flag bit designating whether the word carries message text information or control information (such as an idle branch condition). In the latter case, the control word is blocked by the junction unit so that data message words from a sending station can pass to the main branch without being garbled by the control idle words from the other line station not sending message information.

Multipoint networks are subject to degradation in transmission quality due to bit errors that occur in idle parts of the circuits. Such bit errors will cause the data stream being transmitted to the main or common branch to be garbled if the flag bit is one of the bits that is in error. A common degradation is error bursts and this may result in the garbling of a plurality of data words from the transmitting station.

It is an object of this invention to substantially eliminate garbling of the common branch data stream due to errors that occur on idle parts of the network.

SUMMARY OF THE INVENTION

In accordance with this invention, the junction unit passes each message word received on a branch line if the junction unit had priorly passed a message word received on the branch or had not priorly passed any message word to the common branch (presumably because all branches are idle). Thus, a branch presently sending is enabled to continue to send through the junction unit whereas an idle branch cannot send until the sending branch terminates transmission. Bit errors from the idle branch thereby cannot interfere with the data from the sending branch.

In the illustrative embodiment of the invention, incoming words on each branch are examined to determine if the word has message information and can be passed to the main branch. In the event that passage of a word on a branch is precluded and a word concurrently on another branch is being passed to the main branch, the junction unit is rendered unresponsive to the message information examination of subsequent words on the branch whereby the subsequent message words (actual or simulated) cannot be passed and are thereby blocked. In accordance with a feature of this invention the indication that a message word on the other branch is being passed is maintained for a plurality of word intervals by a counter. The counter initiates a count when the other branch ceases to send message text and removes the indication after a predetermined plurality of word intervals. Accordingly, an error in a message text word, simulating the reception of a control word and making it appear that the branch has terminated transmission, does not permit another branch to begin sending through the junction unit.

In accordance with another feature of this invention, when a message word on a branch is passed to the main branch, the indication thereof is stored to render the junction unit responsive to subsequent message words on the branch. This stored indication is maintained until the counter has determined that the branch has ceased transmission for the plurality of word intervals and, upon that determination, the counter removes the stored indication.

The foregoing and other objects and features of this invention will be more fully understood from the following description of an illustrative embodiment thereof taken with the accompanying drawings.

DETAILED DESCRIPTION

Figure 1:
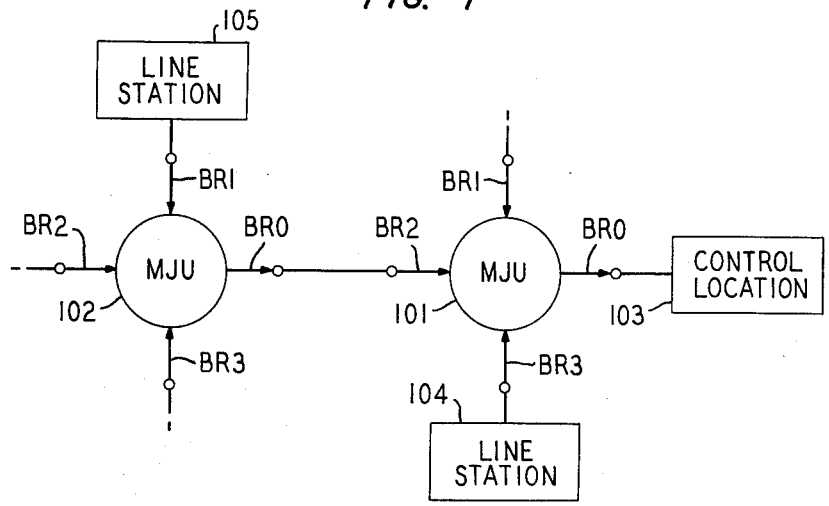
FIG. 1 shows in schematic form a multipoint network of branch lines coupled to junction units.

A portion of synchronous multipoint communication network is shown in FIG. 1 and the portion principally comprises multipoint junction units 101 and 102. Multipoint junction unit 101 terminates four branches identified by lines BR0, BR1, BR2 and BR3. Each of the branches advantageously accommodates two-way or full duplex line signaling. For the purposes of this invention, however, there is only disclosed one-way signaling which specifically comprises incoming signaling to multipoint junction unit 101 from branches BR1, BR2 and BR3 and outgoing signaling from multipoint junction unit 101 to branch BR0. In general, it is the function of multipoint junction unit 101 to combine the incoming signals from branches BR1, BR2 and BR3 and apply them to common branch BR0. Multipoint junction unit 102 is arranged in substantially the same way as multipoint junction unit 101 and similarly terminates four branches which are correspondingly identified as branches BR0, BR1, BR2 and BR3.

As seen in FIG. 1, branch BR0 of multipoint junction unit 102 extends to branch BR2 of multipoint junction unit 101. Branch BR0 of multipoint junction unit 101 extends to a remote control location which is identified as station 103. Each of the other branches of the multipoint junction units is similarly connected to other ones of the stations or other ones of the multipoint junction units. For example, branch BR3 of multipoint junction unit 101 is connected to line station 104 and branch BR1 of multipoint junction unit 102 is connected to line station 105. In addition, it is to be noted that the junction units, including the two shown in FIG. 1, may be located at separate offices.

Each of the line stations connected to the multipoint junction units, such as line stations 104 and 105, and each multipoint junction unit includes conventional signal equipment arranged to transmit synchronous data to the branch line connected thereto. Control location 103 and each multipoint junction unit includes conventional receiving equipment arranged to receive synchronous data from the incoming branch line connected thereto. All the sending equipment and circuitry at the remote stations, the receiving equipment at control location 103 and sending and receiving equipment at each of the multipoint junction units are controlled by a common clock or by synchronized clocks.

Transmission is in a word format, each word having eight bits and each bit occupying a corresponding time slot. All of the signaling from the various sending equipment is synchronized so that each bit of a word being transmitted from any sending equipment occupies the same time slot as a corresponding bit of a word being transmitted from any other sending equipment. These time slots are defined by a bit clock whose timing wave is represented by wave BC in FIG. 3. As shown therein, wave BC defines one word (or one byte) wherein the time slots are numbered therein 1 through 8.

In accordance with the signaling arrangement, the bits in the first seven time slots of each word carry the signaling information and the bit in the eighth time slot interval comprises a "flag" bit which indicates whether a word constitutes a data word or a control word. A 1 bit in the eighth time slot designates a data word which provides message text information and a 0 bit designates a control word which provides housekeeping information. The housekeeping information, for the purpose of this disclosure, may constitute an "idle" line condition which designates the absence of message text, the idle word comprising 1 bits for the first seven time slots and a 0 bit in the eighth time slot interval to indicate that the word is a control word. It is contemplated that each line or branch will always contain a word, data or control, and therefore will always indicate whether message text information or an idle condition exists on the branch.

As indicated above, it is one general function of the network to convey synchronous data from any station to control location 103. In the specific network arrangement shown herein, a line station, such as line station 104, cannot communicate with another line station, such as line station 105, and two line stations cannot transmit to the control location at the same time. As noted above, a system of this type is generally described in U.S. Pat. No. 3,914,743 issued Oct. 21, 1975 to S. M. Fitch, L. M. Kolensky, J. C. Panek, D. W. Rice and W. R. Schaeffer.

In accordance with this illustrative embodiment, each multipoint junction unit includes the sending and receiving equipment and the circuitry for combining the incoming signals for application to common branch BRO, as described above and further includes control equipment which precludes the conveying of error signals from an idle one of branches BR1 to BR3 to common branch BRO. More specifically, the control equipment blocks incoming bytes received from any one of the incoming branches unless the prior incoming byte from the branch was passed through and applied to output branch BR0 or all of the incoming branches are idle and prior bytes passed to output branch BR0 were idle control bytes. The control equipment is described, in detail, hereinafter with regard to FIG. 2.

Figure 2:
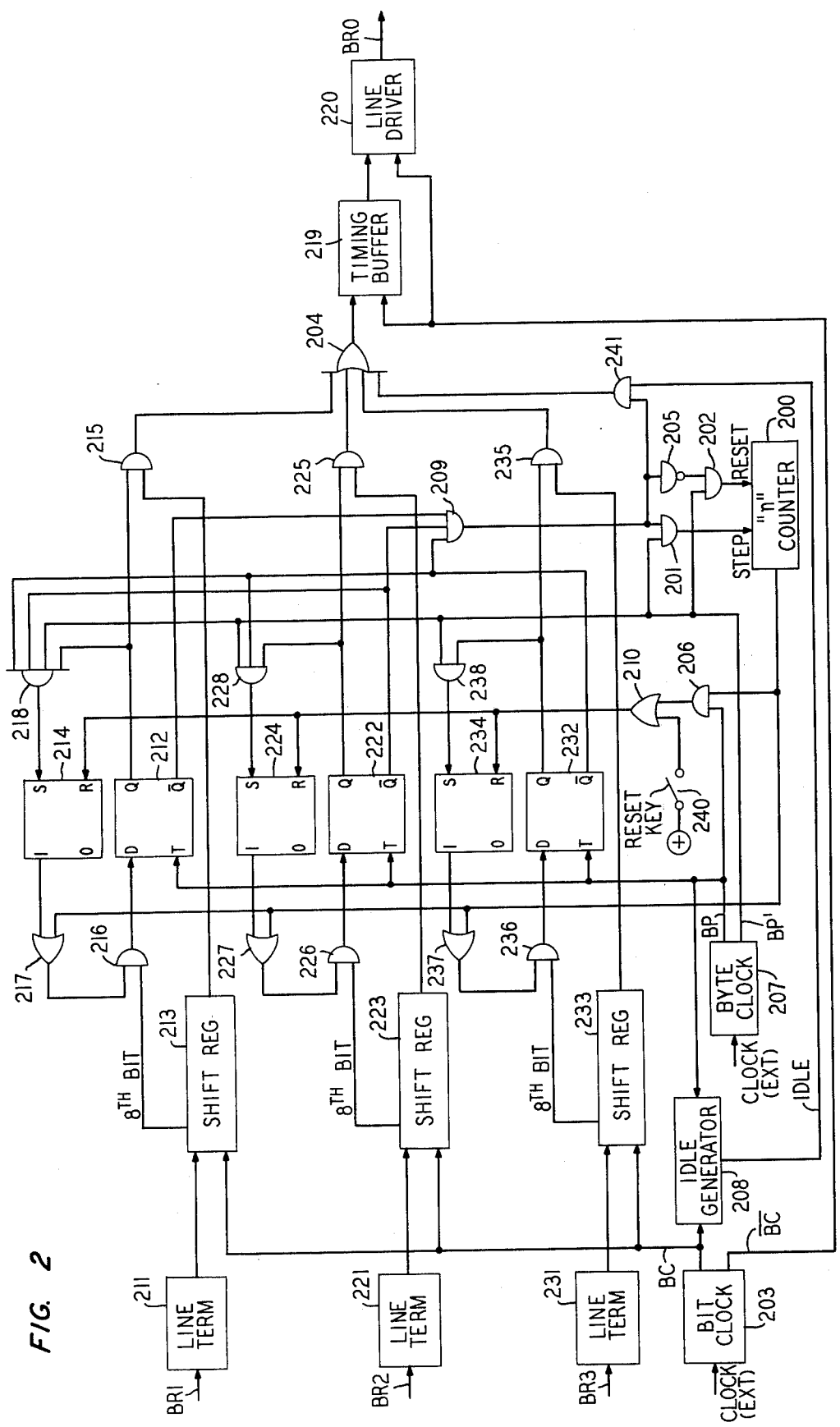
FIG. 2 discloses in schematic form the details of circuitry and equipment of a multipoint junction unit arranged in accordance with this invention.

FIG. 2 discloses in detail a typical multipoint junction unit such as multipoint junction unit 101 or 102 shown in FIG. 1. The incoming branches are correspondingly identified as branches BR1, BR2 and BR3 in FIG. 2 and terminate in line terminators 211, 221 and 231. Each line terminator converts incoming line signals from the associated incoming branch to data bits and serially applies the data bis to an associated one of shift registers 213, 223 and 233.

Shift register 213 (and similarly shift registers 223 and 233) has a plurality of stages sufficient in number to store the eight bits of a data word or byte. The serial bits of each byte from line terminator 211 are shifted in and through the eight stages of shift register 213 by bit clock pulses shown as timing wave BC in FIG. 3. These bit clock pulses are provided by bit clock 203 which is advantageously phase locked to an external bit clock source. Bit clock 203 also provides the inversion of the bit clock pule, which inverted bit clock pulses are passed to lead $\overline{BC}$.

When a byte is fully stored in the shift register, such as shift register 213, the eighth or flag bit of the byte is stored in the eighth stage and the eighth stage output is passed to gate 216. If gate 216 is presently enabled, as described hereinafter, the flag bit is passed therethrough to the D input terminal of flip-flop 212. Thus, if the byte is a control byte, the 0 bit in the eighth stage provides a low output to the D input terminal while alternatively the reception of a data byte results in the storage of a 1 bit in the eighth stage and a high potential output is applied to the D input terminal of flip-flop 212. A pulse appearing on lead BP during the eighth or flag bit interval thereupon toggles flip-flop 212 to the clear condition in response to a control (or idel) byte and to the set condition in response to the reception of a data byte.

Figure 3:
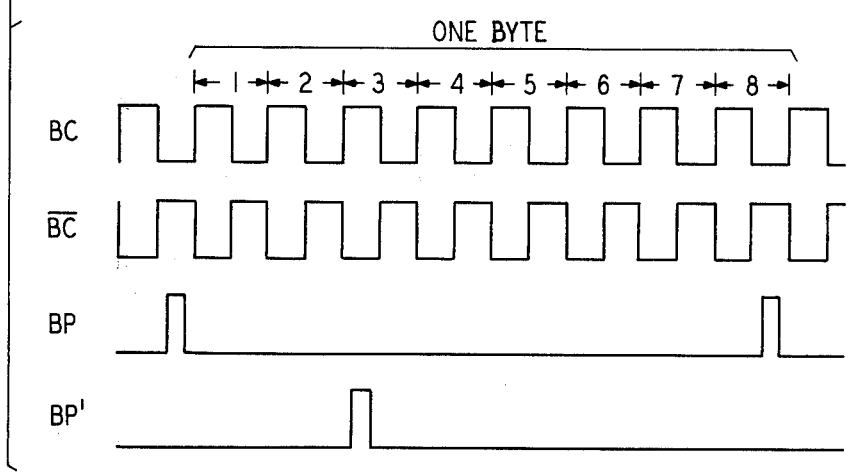
FIG. 3 depicts timing waves produced by clocking equipment shown in FIG. 2.

The clock pulses on lead BP, shown as timing wave BP in FIG. 3, are provided by byte clock 207 which is advantageously phase locked to an external clock signal. Byte clock 207 also provides a BP' pulse whose timing wave is also shown in FIG. 3, which BP' pulse is a delayed replica of the BP pulse and therefore appears during a bit interval, other than the flag bit, for each byte.

Flip-flops 222 and 232 operate in substantially the same manner as flip-flop 212 with respect to bytes received over incoming branches BR2 and BR3, each of the flip-flops being toggled when associated gates 226 and 236 are enabled to the set condition when a data byte is received and to the clear condition when a control or idle byte is received. It is noted that when gates 216, 226 and 236 are disabled, flip-flops 212, 222 and 232 are invariably toggled to the clear condition.

Flip-flop 212 in the set condition enables AND gate 215. Under this condition the data byte received over incoming branch BR1 and stored in shift register 213 is thereafter shifted out by the bit clock pulse BC through AND gate 215 and OR gate 204 to timing buffer 219. Timing buffer 219 is arranged to retime and realign the serial bit stream under the control of bit clock pulses on lead $\overline{BC}$. These retimed bit pulses are passed to line driver 220 which under the control of the bit clock pulses on lead $\overline{BC}$ reconverts the bit stream to line signals and passes the line signals to outgoing line branch BR0. Similarly, flip-flop 222 or 232, in the set condition, enables gate 225 or 235 passing the byte shifted out through the associated shift register to timing buffer 219. Accordingly, incoming data bytes from any one of branches BR1 through BR2 are converted to data bits and assuming the data stream is arranged to pass through the multipoint junction unit by virtue of the fact that the associated gate (such as gates 215, 225 or 235) is enabled, the converted data bits are combined in OR gate 204, retimed by timing buffer 219 and reconverted to line signals by line driver 220 for application to common outgoing branch BR0.

The control of each incoming data bit stream, in accordance with this invention, is provided by flip-flops 214, 224 and 234, each associated with an incoming line BR1, BR2 and BR3 and is also provided by N counter 200 together with associated gate circuitry described in detail hereinafter. In general, it is the function of this flip-flop, counter and gate circuitry to block incoming bytes unless the prior incoming byte from the branch was unblocked or N prior bytes passed to output branch BR0 were idle bytes. Additionally, gates 218, 228 and 238 provide a preference chain for selecting only one of the incoming branches when two or more branches simultaneously contend for access through the multipoint junction unit.

In the initial condition all of the flip-flops are in the cleared condition: flip-flops 214, 224 and 234 are advantageously cleared by a high condition passed through reset key 240 and OR gate 210 to the reset inputs of the flip-flops and flip-flops 212, 222 and 232 being cleared by virtue of the idle condition on all incoming branches. With all of flip-flops 212, 222 and 232 in the clear condition all $\overline{Q}$ outputs are high enabling AND gate 209. AND gate 209, in turn, enables AND gates 201 and 241 and disables AND gate 202 by way of inverter 205.

AND gate 241 enabled extends the output of idle generator 208 to OR gate 204. Idle generator 208 under control of the bit clock pulses on lead BC to define the bit time slot intervals and the byte clock pulses on lead BP to define the byte intervals generates successive idle bytes appropriately aligned with the data throughout the system. The bits of the idle bytes are passed to lead IDLE and these serial bits are then passed through enabled gate 241 and OR gate 204 to timing buffer 219 for retiming. The retimed bits are applied to line driver 220 which, as previously described, converts the bits to line signals and thereby applies successive idle bytes to common output branch BR0. In this idle condition the multipoint junction unit therefore sends idle bytes onto common branch BR0.

The enabling of AND gate 201 passes the BP' pulse to the set input of N counter 200. Accordingly, the count in N counter 200 is advanced 1 during each byte interval. After N byte intervals (which for this embodiment is arranged to be eight byte intervals), the counter reaches its maximum count (of eight) and provides a 1 output. This 1 output is maintained until N counter 200 is reset, as described hereinafter. The 1 output of N counter 200 enables AND gate 206 and also enables AND gates 216, 226 and 236 by way of OR gates 217, 227 and 237.

Assume now that a data byte is received on one of the incoming branches such as branch BR2. The line signals are converted to bits, as previously described, and the bit stream is passed to shift register 223 and shifted into the shift register until the byte is fully stored. Since we have assumed that a data byte is received, the flag bit is 1 and a 1 bit is stored in the eighth stage when the BP pulse appears on lead BP. The 1 bit output of the eighth stage is passed to AND gate 226. AND gate 226, being enabled, applies the 1 bit to the D inut of flip-flop 222. At this instant the BP pulse is applied to the toggle input of flip-flop 222 and the flip-flop is set. The setting of the flip-flop disables AND gate 209 and this in turn disables AND gate 201 and AND gate 241 and enables AND gate 202 by way of inverter 205. The disabling of AND gate 241 terminates the passage of the idle bytes from idle generator 208 to OR gate 204. The setting of flip-flop 222 also enables AND gate 225 and with AND gate 225 enabled the byte in shift register 223 is shifted out and passed to output branch BR0.

If it be assumed that another branch such as branch BR1 simultaneously receives a data byte, flip-flop 212 is simultaneously set in the same manner as flip-flop 222 was set. With flip-flops 212 and 222 set and flip-flop 232 cleared, AND gate 238 is disabled by flip-flop 232, AND gate 228 is enabled by flip-flops 222 and 232 and AND gate 218 is disabled by flip-flop 222. Thus, only one of flip-flops 214, 224 or 234 will be set, as described hereinafter. Since only AND gate 228 is enabled under the circumstances described above, branch BR2 is selected over branch BR1 for the purpose of subsequent passage of the incoming bit stream to output branch BR0, as described hereinafter. It can be seen that if, prior to a branch selection, data bytes are simultaneously received on any two (or three) incoming branches, the preference chain gates 218, 228 and 238 are individually enabled to select the highest number branch of the two active branches.

Assume now that a branch, such as branch BR2, is selected and the first data byte is being passed to outgoing branch BR0, as previously described. During the byte interval while the data byte is being passed to the output branch, byte clock 207 generates byte clock pulse BP'. This pulse is passed through AND gate 202 to reset N counter 200. The output of N counter 200 goes low disabling AND gate 206. At the same time N counter 200 removes its enabling potential applied through OR gates 217, 227 and 237 to AND gates 216, 226 and 236. Byte clock pulse BP' is also passed through preference chain gate 228 to set flip-flop 224. With flip-flop 224 set, the high potential at its 1 output terminal is passed through OR gate 227 to AND gate 226. Thus, AND gate 226 is enabled and AND gates 216 and 236 are disabled.

With AND gates 216 and 236 disabled, the eighth or flag bit from shift registers 213 and 233 are blocked. Accordingly, flip-flops 212 and 232 are unresponsive to the reception of bytes over branches BR1 and BR3. Flip-flops 212 and 232 are therefore maintained in the clear condition even when data bytes ae recieved, and gates 215 and 235 are thereby disabled to block these incoming data bytes on branches BR1 and BR3 and prevent them from passing through OR gate 204 to outgoing branch BR0.

As each incoming data message byte is received on branch BR2, flip-flop 222 is maintained set and gate 209 is maintained disabled, disabling in turn gate 201 to preclude stepping of N counter 200 and maintaining gate 202 enabled to reset the counter. N counter 200 thus cannot count so long as data bytes from branch BR2 are being passed to output branch BR0.

Assume now that incoming branch BR2 goes idle whereby successive idle bytes are received by shift register 223. A 0 bit is now derived from the eighth stage of the shift register passing a low condition through gate 226 to the D input of flip-flop 222. The BP pulse from byte clock 207 now toggles flip-flop 222 to the clear condition blocking gate 225 to preclude passage of the byte in shift register 223 to output branch BR0. Since none of the incoming branches are passing data through the multipoint junction unit, flip-flops 212, 222 and 232 are all in the cleared condition enabling AND gate 209. This enables in turn AND gates 201 and 241 and disables gate 202 by way of inverter 205.

The enabling of AND gate 241 now passes the idle byte therethrough to output branch BR0. The disabling of AND gate 202 precludes resetting of N counter 200. Finally, the enabling of AND gate 201 extends lead BP' to the step input of N counter 200. N counter 200 is now advanced to the count of one in response to the BP' pulse which, as previously described, is a delayed replica of the BP pulse and therefore occurs during each byte interval.

In the event that an incoming message byte is again received on branch BR2, a 1 bit is again derived from the eighth stage and passed through AND gate 226 to again set flip-flop 222. AND gate 209 is again disabled, disabling AND gates 201 and 241 and enabling AND gate 202. At the same time, AND gate 225 is enabled. The idle byte from idle generator 208 is blocked and the incoming byte from branch BR2 is again passed to output branch BR0. The enabling of AND gate 202 now passes the BP' pulse to the reset input of N counter 200 whereby the counter is reset to its initial count. The multipoint junction unit is now restored to the condition wherein branch BR2 is active and the other two branches are blocked.

Assume now that incoming branch BR2 remains idle. Accordingly, so long as incoming branch BR2 remains idle, N counter 200 is stepped during each byte interval until it achieves the count of N (which is assumed to be the count of eight). N counter 200 thereupon enables AND gate 206 and additionally enables AND gates 216, 226 and 236 by way of OR gates 217, 227 and 237. The enabling of AND gate 206 passes the BP pulse therethrough and through OR gate 210 to clear flip-flop 224. Accordingly, all of the flip-flops are again cleared, idle bytes are passed to output branch BR0 and the multipoint junction unit is restored to the previously described initial condition wherein all of the input branches are idle.

Although a specific embodiment of this invention has been shown and described, it will be understood that various modifications may be made without departing from the spirit of this invention.

What is claimed is:

1. A junction unit having signaling paths interconnecting a plurality of incoming lines with an outgoing line, each of the lines arranged to convey data words which include presence and absence of message information, each of the signaling paths including means for enabling passage of each incoming word on an incoming line to the outgoing line in response to presence of message information in the incoming word whereby the passage enabling means is disabled and blocks the passage of the incoming word in the absence of message information in the word, characterized by means effective when the passage enabling means is disabled and responsive to an indication of the enabling of the passage of a word by another one of the passage enabling means for rendering the first passage enabling means unresponsive to the presence of message information in subsequent ones of the incoming words on the incoming line.

2. A junction unit, in accordance with claim 1, and further including means responsive to the enabling of said another one of the passage enabling means for maintaining the indication of the enabling of said another passage enabling means when subsequent incoming words are on the incoming line.

3. A junction unit, in accordance with claim 2, wherein the indicating means includes means for maintaining the indication of the enabling of said another passage enabling means for an interval of time corresponding to the time that a plurality of the subsequent incoming words are on any one of the incoming lines.

4. A junction unit, in accordance with claim 3, where in the maintaining means comprises a counter having a count which is advanced for each interval that a word is on an incoming line and which is reset in response to the enabling of said another passage enabling means, the counter including means for removing the indication of the enabling of said another passage enabling means upon achieving a count corresponding to the number of words in the plurality of subsequent incoming words.

5. A junction unit, in accordance with claim 2, wherein the means for rendering the passage enabling means unresponsive further includes means individual to each passage enabling means and responsive to the enabling of the passage of an incoming word for storing a designation thereof during intervals when subsequent incoming words are on the incoming lines.

6. A junction unit, in accordance with claim 5, and further including means responsive to the stored designation for rendering the passage enabling means responsive to the subsequent incoming words on the incoming line.

7. A junction unit, in accordance with claim 5, and further including means responsive to absence of the indication of the enabling of said another passage enabling means by the indicating means for removing the stored designation from the storing means.

8. A junction unit, in accordance with claim 5, and further including a preference means for selecting one of the storing means in response to the concurrent enabling of a plurality of passage enabling means, the selecting means including means for precluding storage in unselected ones of the storing means.

9. A junction unit interconnecting a plurality of incoming lines with a common outgoing line, each of the lines arranged to convey data words which include presence and absence of message information, the junction unit having means individual to each incoming line responsive to the presence of message information in the incoming word for providing passage of the incoming word from the incoming line to the outgoing line whereby the word is blocked in the absence of message information in the word;

means for normally rendering the passage means unresponsive to the presence of message information in the incoming word;

further means individual to each passage means responsive to the blocking of words by all of the passage means for rendering the individual passage means responsive to the presence of message information in subsequent ones of the incoming words; and other means responsive to the individual passage means providing passage of an incoming word for rendering the passage means responsive to the presence of message information in subsequent ones of the incoming words on the incoming line.

* * * * *